(12) United States Patent
Etchegoyen (10) Patent No.: US 9,338,152 B2
(45) Date of Patent: May 10, 2016

(54) PERSONAL CONTROL OF PERSONAL INFORMATION

(75) Inventor: Craig S. Etchegoyen, Newport Beach, CA (US)

(73) Assignee: Uniloc Luxembourg S.A., Luxembourg (LU)

(*) Notice: Subject to any disclaimer, the term of this patent is extended or adjusted under 35 U.S.C. 154(b) by 177 days.

(21) Appl. No.: 13/586,057

(22) Filed: Aug. 15, 2012

(65) Prior Publication Data

US 2013/0055357 A1   Feb. 28, 2013

Related U.S. Application Data (60) Provisional application No. 61/523,748, filed on Aug. 15, 2011.

(30) Foreign Application Priority Data

Aug. 14, 2012  (WO) ................ PCT/US2012/050680
Aug. 15, 2012  (AU) ................................ 2012100459

(51) Int. Cl.
*H04L 29/06* (2006.01)
*G06F 21/34* (2013.01)

(52) U.S. Cl.
CPC ................ *H04L 63/08* (2013.01); *G06F 21/34* (2013.01); *H04L 63/10* (2013.01)

(58) Field of Classification Search
CPC ....................................................... H04L 63/10
USPC ............................................................ 726/4
See application file for complete search history.

(56) References Cited

U.S. PATENT DOCUMENTS

| | | |
|---|---|---|
| 5,991,735 A | 11/1999 | Gerace |
| 6,138,155 A | 10/2000 | Davis et al. |
| 6,167,517 A | 12/2000 | Gilchrist et al. |
| 6,173,283 B1 | 1/2001 | Kasso et al. |
| 6,195,447 B1 | 2/2001 | Ross |
| 6,754,665 B1* | 6/2004 | Futagami et al. |
| 6,985,953 B1 | 1/2006 | Sandhu et al. |
| 6,993,580 B2* | 1/2006 | Isherwood et al. ........... 709/225 |

(Continued)

FOREIGN PATENT DOCUMENTS

WO    WO 2010/104928    9/2010

OTHER PUBLICATIONS

International Search Report and Written Opinion dated Nov. 23, 2012 issued to PCT Application PCT/US12/50680.

(Continued)

*Primary Examiner* — Andrew Georgandellis
(74) *Attorney, Agent, or Firm* — Sean D. Burdick (57) ABSTRACT

A personal information server provides personal information about an individual to a third-party only when authorized by the individual through use of a previously authenticated computing device. The personal information server authenticates both the computing device used by the third-party to access the personal data and the device used by the individual to grant or deny such access using highly secure digital fingerprints of each. The individual can allow the third-party multiple instances of access to the personal information within restrictions specified by the individual. Other advantages also arise from large-scale tracking of which devices access and control personal information of many people—particularly with respect to identifying and preventing fraud and identity theft.

5 Claims, 9 Drawing Sheets

(56) References Cited

U.S. PATENT DOCUMENTS

| | | | |
|---|---|---|---|
| 7,272,728 | B2 | 9/2007 | Pierson et al. |
| 7,319,987 | B1 | 1/2008 | Hoffman et al. |
| 7,523,860 | B2 | 4/2009 | Bonelle et al. |
| 7,590,852 | B2 | 9/2009 | Hatter et al. |
| 7,739,402 | B2 | 6/2010 | Roese |
| 7,890,463 | B2 * | 2/2011 | Romem et al. ............... 707/636 |
| 8,171,287 | B2 * | 5/2012 | Villela ......................... 713/168 |
| 8,190,475 | B1 | 5/2012 | Merrill |
| 8,255,948 | B1 | 8/2012 | Black et al. |
| 8,635,087 | B1 | 1/2014 | Igoe et al. |
| 2001/0049620 | A1 | 12/2001 | Blasko |
| 2002/0010864 | A1 | 1/2002 | Safa |
| 2003/0131001 | A1 | 7/2003 | Matsuo |
| 2003/0163483 | A1 | 8/2003 | Zingher et al. |
| 2004/0030912 | A1 | 2/2004 | Merkle et al. |
| 2004/0143746 | A1 | 7/2004 | Ligeti et al. |
| 2004/0187018 | A1 | 9/2004 | Owen et al. |
| 2004/0236649 | A1 | 11/2004 | Yip et al. |
| 2005/0010780 | A1 | 1/2005 | Kane et al. |
| 2005/0187890 | A1 | 8/2005 | Sullivan |
| 2005/0278542 | A1 | 12/2005 | Pierson et al. |
| 2006/0123101 | A1 * | 6/2006 | Buccella et al. ............. 709/223 |
| 2006/0161914 | A1 | 7/2006 | Morrison et al. |
| 2006/0222212 | A1 | 10/2006 | Du et al. |
| 2006/0282660 | A1 | 12/2006 | Varghese et al. |
| 2007/0050638 | A1 | 3/2007 | Rasti |
| 2007/0113090 | A1 | 5/2007 | Villela |
| 2007/0219917 | A1 | 9/2007 | Liu et al. |
| 2007/0234409 | A1 | 10/2007 | Eisen |
| 2007/0239606 | A1 | 10/2007 | Eisen |
| 2007/0294403 | A1 | 12/2007 | Verona |
| 2008/0027858 | A1 | 1/2008 | Benson |
| 2008/0028455 | A1 | 1/2008 | Hatter et al. |
| 2008/0040802 | A1 | 2/2008 | Pierson et al. |
| 2008/0092058 | A1 | 4/2008 | Afergan et al. |
| 2008/0109491 | A1 | 5/2008 | Gupta |
| 2008/0120195 | A1 | 5/2008 | Shakkarwar |
| 2008/0212846 | A1 | 9/2008 | Yamamoto et al. |
| 2008/0235375 | A1 | 9/2008 | Reynolds et al. |
| 2008/0242279 | A1 | 10/2008 | Ramer et al. |
| 2009/0089869 | A1 | 4/2009 | Varghese |
| 2009/0150330 | A1 | 6/2009 | Gobeyn |
| 2009/0254476 | A1 | 10/2009 | Sharma et al. |
| 2009/0292743 | A1 | 11/2009 | Bigus et al. |
| 2009/0320096 | A1 * | 12/2009 | Nolan et al. ....................... 726/2 |
| 2010/0125911 | A1 | 5/2010 | Bhaskaran |
| 2010/0185871 | A1 * | 7/2010 | Scherrer et al. ............... 713/186 |
| 2010/0235241 | A1 | 9/2010 | Wang et al. |
| 2010/0305989 | A1 | 12/2010 | Mu et al. |
| 2011/0040825 | A1 | 2/2011 | Ramzan et al. |
| 2011/0264644 | A1 | 10/2011 | Grant et al. |
| 2011/0270694 | A1 | 11/2011 | Halim |
| 2011/0302003 | A1 | 12/2011 | Shirish et al. |
| 2011/0319060 | A1 | 12/2011 | Gentemann |
| 2012/0030771 | A1 | 2/2012 | Pierson et al. |
| 2012/0041969 | A1 | 2/2012 | Priyadarshan et al. |
| 2012/0063427 | A1 | 3/2012 | Kandekar et al. |
| 2012/0185921 | A1 * | 7/2012 | Wechsler et al. .................. 726/4 |
| 2012/0233665 | A1 | 9/2012 | Ranganathan et al. |

OTHER PUBLICATIONS

Gupta et al., "Efficient Fingerprint-based User Authentication for Embedded Systems," Proceedings of the 42nd Annual Design Automation Conference, New York City, New York, 2005.

"German Stores Put Money at Your Fingertips", Independent On-line, Sep. 4, 2007.

"Lowes Foods Brings Biometric Payments and Check Cashing to Its Customers," Banking & Financial Solutions, Bioguard Components & Technologies Ltd, Feb. 7, 2005.

"Pay by Touch," From Wikipedia, Feb. 22, 2011, 2 pages.

Agbinya et al., "Development of Digital Environment Identity (DEITY) System for On-line Access," Third International Conference on Broadband Communications, Information Technology & Biomedical Applications, Third International Conference on IEEE, Piscataway, New Jersey, Nov. 23, 2008, 8 pages. XP031368250.

Johnson et al. "Dimensions of Online Behavior: Toward a User Typology," Cyberpsycology and Behavior, vol. 10, No. 6, pp. 773-779, 2007. XP002617349.

Kurchak, Kent, "Notes Application Strategies: User Activity Tracking," Mar. 14, 2004, 14 pages.

Lemos, Robert, "Fingerprint Payments Taking Off Despite Security Concerns," Security Focus, Oct. 10, 2007, 3 pages.

Sim et al. "Continuous Verification Using Multimodal Biometrics", *IEEE Transactions on Pattern Analysis and Machine Intelligence*, vol. 29, No. 4, Apr. 1, 2007, IEEE Serivce Center, Los Alamitos, CA, pp. 687-700. XP011168507.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Lee et al., "Analogous Content Selection Mechanism Using Device Profile and Content Profile for U-Learning Environments," 2009 Ninth IEEE International Conference on Advanced Learning Technologies, IEEE Computer Society.

Fraga, David, "Information Technology, Regime Stability and Democratic Meaningfulness: A Normative Evaluation of Present and Potential Trends," Honor's Thesis for a Degree for College Undergraduate Research, University of Pennsylvania, Mar. 30, 2007, 73 pages.

Soto, Lucy, "Not-so-Private Web: Information Leaks on Social Networks Can Leave Users Vulnerable," The Atlanta Journal-Constitution, Feb. 14, 2010, 3 pages.

Transcript from CBS Corp New, UBS Global Media Conference on Dec. 3, 2007 with Dave Poltrack by Matt Coppett, 9 pages.

Clarke et al. "Secure Hardware Processors Using Silicon One-Way Functions," MIT Laboratory for Computer Science, Mar. 2002, p. 141.

Gassend, et al., Silicon Physical Unknown Functions and Secure Smartcards, May 2002.

Keane et al. "Transistor Aging," IEEE Spectrum, Apr. 25, 2011.

Lazanu et al., Modelling spatial distribution of defects and estimation of electrical degradation of silicon detectors in radiation fields at high luminosity, Oct. 10, 2006, 5 pages.

* cited by examiner

PERSONAL CONTROL OF PERSONAL INFORMATION

This application claims priority to U.S. Provisional Application 61/523,748, which was filed on Aug. 15, 2011, and which is fully incorporated herein by reference.

BACKGROUND OF THE INVENTION

1. Field of the Invention

The present invention relates generally to network-based computer services and, more particularly, to methods of and systems for enabling a person to control access to information about that person held by other entities.

2. Description of Related Art

In this Information Age, information about a person can dramatically affect the person's life. As an example, a surprisingly common misuse of information about a person is identity theft, in which a third-party impersonates the person using their personal information for fraudulent authentication. Yet, most people have little or no control of third-party access to important, personal information about themselves.

One example is that of credit history. Many commercial transactions, such as automobile purchases and rental agreements, require access to a person's social security number, typically for retrieval of the person's credit history. Once a third-party has a person's social security number, the third party can collect the credit history of that person in perpetuity. And, while social security numbers are generally not intended for authentication of a person's identity, social security numbers are frequently used for exactly that purpose. Continued possession of a person's social security number and ability to get up-to-date credit histories facilitates identity theft and other nefarious acts.

Yet, access to a person's credit history is solely up to the corporate entity warehousing the information and a third-party hoping to gain access. The person to whom the information pertains is heretofore not considered an interested party with any control over such access whatsoever.

What is needed is a system by which people can control access to personal information about themselves.

SUMMARY OF THE INVENTION

In accordance with the present invention, a personal information server provides personal information about an individual to a third-party only when authorized by the individual through use of a previously authenticated computing device. The personal information server authenticates both the computing device used by the third-party to access the personal data and the device used by the individual to grant or deny such access using highly secure digital fingerprints of each.

To grant access to personal information to a third-party, e.g., to provide credit history information to an automobile dealer as a prerequisite for an automobile loan, the individual provides sufficient information to the third-party to identify both the personal information server and to allow the personal information server to identify the individual. The third-party uses that information to contact the personal information server and request personal information of that individual.

The personal information server notifies the individual in a predetermined manner, e.g., by e-mail, and provides a user interface by which the user can grant or deny the request of the third-party to access the personal information. Denial by the individual of such access suggests that the third-party request for access to the personal information indicates that the device from which the request originated can be perpetrating a fraud, and the personal information server records the digital fingerprint of the device as such. In addition, granting of the request for access to the personal information is only accepted from a previously authorized device used by the individual that is authenticated as such by the device's digital fingerprint.

The personal information server also provides a user interface through which the individual can allow the third-party multiple instances of access to the personal information within restrictions specified by the individual. Examples of such restrictions include a period of time during which the personal information can be repeatedly accessed, a number of times the personal information can be accessed, a minimum frequency with which the personal information can be accessed, and a particular type of personal information that can be accessed.

Probably the most immediate advantage of the personal information server in accordance with the present invention is that an individual has full control over what other entities have access to personal information about the individual. Nothing else in use today can do that.

Other advantages also arise from large-scale tracking of which devices access and control personal information of many people—particularly with respect to identifying and preventing fraud and identity theft.

The personal information server can detect fraud by detecting that a number of customer devices authorized to control access to personal information of a given individual exceed a predetermined limit. For example, it may be deemed that a given individual will be unlikely to use more than three devices to control access to her personal information. Accordingly, five (5) authorized customer devices might raise alarm, ten (10) can be assumed to indicate fraudulent activity, and thirty (30) or more quite certainly indicates fraudulent activity.

The personal information server can also detect fraud by determining a number of individuals whose personal information for which a given device is authorized to control access. While it is not uncommon for a given computing device to be used by more than one person, it can be a policy of the personal information server to never allow a single customer device to be used to control access to personal information of more than one individual or a relatively small predetermined number of individuals, such as three (3). Limiting a device to control access to personal information of no more than a single individual makes particularly good sense for specific types of customer devices, such as smart-phones and other portable and highly personal devices.

Beyond just the number of individuals whose personal information access can be controlled by a single device, the personal information server can make other comparisons between the multiple individuals whose personal information access can be controlled by a single device to detect fraudulent behavior. For example, if the personal information server determines that individuals with current residential addresses that are hundreds or even thousands of miles apart are sharing a device to manage access to their personal information, such is so unlikely to be accurate information as to warrant a presumption of fraudulent behavior. To be particularly secure, the personal information server can require that the respective current residential addresses of the multiple individuals be the same, e.g., a predetermined distance of zero meters.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The In accordance with the present invention, a personal information server 108 (FIG. 1) provides personal information about an individual to a third-party, e.g., a vendor using a vendor device 104, only when authorized by the individual through use of a previously authenticated computing device, e.g., customer device 102. Personal information server 108 authenticates both customer device 102 and vendor device 104 using highly secure digital fingerprints of each.

Figure 1:
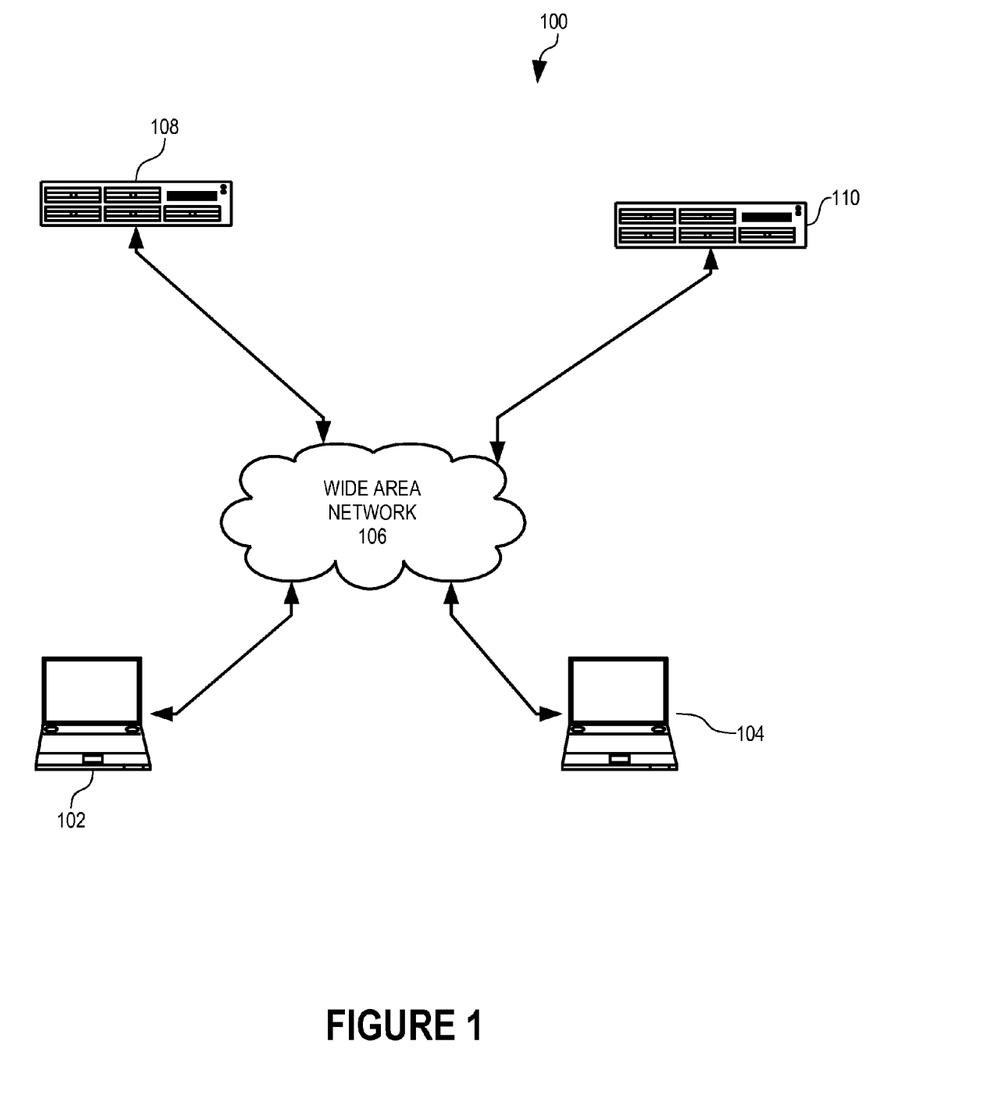
FIG. 1 is a diagram showing a customer device, a vendor device, a personal information server computer, and another personal information server computer that cooperate to allow an individual to control third-party access to personal information about that individual in accordance with one embodiment of the present invention.

The personal information can be aggregated and warehoused by personal information server 108 or can be retrieved from another personal information server 110. For example, if the personal information is credit history information, other personal information server 110 can be maintained by any of the credit history service providers currently in existence, and personal information server 108 can retrieve credit history information from personal information server 110 on behalf of an individual as needed.

Customer device 102, vendor device 104, and personal information servers 108 and 110 can communicate with one another through a wide area computer network 106, which is the Internet in this illustrative embodiment.

Transaction flow diagram 200 (FIG. 2) illustrates the manner in which a third-party is granted access to personal information about an individual by that individual through personal information server 108 in accordance with the present invention. To facilitate appreciation and understanding of the invention, transaction flow diagram 200 is described in the context of an illustrative example of an individual applying for a loan to purchase an automobile from an automobile dealership. Of course, there are other types of personal information that an individual would consider sensitive and would want control over its access. Other examples include medical histories, criminal/court records, driving records, group memberships, etc.

Figure 2:
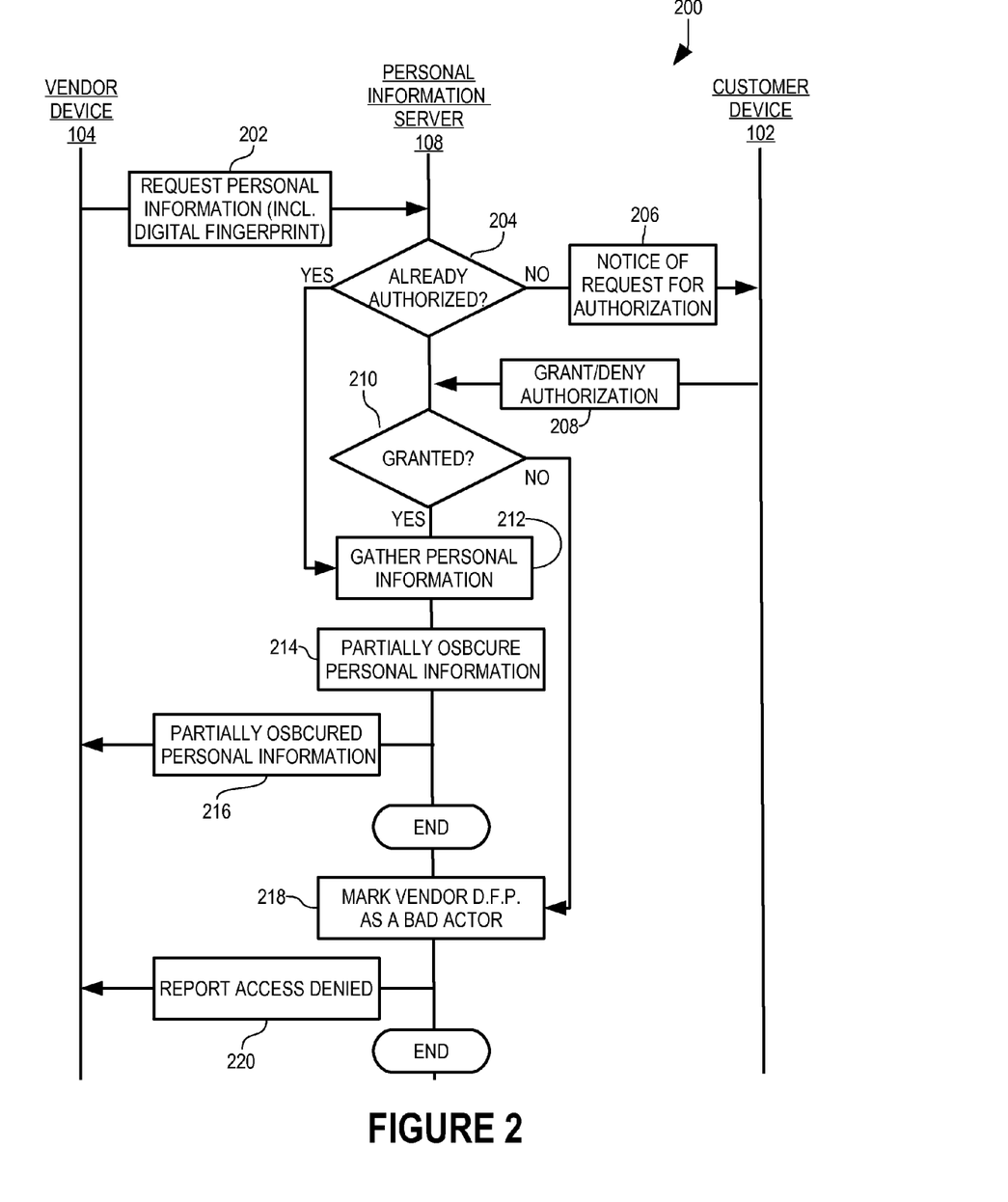
FIG. 2 is a transaction flow diagram illustrating one embodiment according to the invention of a method by which the customer device, vendor device, and personal information server computer of FIG. 1 cooperate to grant the vendor device access to personal information of an individual only when granted by the individual through the customer device.

Prior to the steps of transaction flow diagram 200, the individual provides the dealership with information sufficient to identify personal information server 108 and to allow personal information server 108 to identify the individual herself For example, the individual can provide the dealership with a URL that addresses personal information server 108 and includes a user identify of the individual that allows personal information server 108 to identify the individual.

In step 202 (FIG. 2), the dealership uses vendor device 104 to send a request for personal information of the individual loan applicant. The request identifies the individual and, particularly in embodiments in which personal information server 108 controls access to multiple types of personal information, the particular type of personal information desired. In this illustrative embodiment, the type of personal information desired is a credit history.

Vendor device 104 also includes its digital fingerprint 722 (FIG. 7) in the request of step 202 (FIG. 2). Digital fingerprints are known and are described, e.g., in U.S. Pat. No. 5,490,216 (sometimes referred to herein as the '216 Patent), and in U.S. Patent Application Publications 2007/0143073, 2007/0126550, 2011/0093920, and 2011/0093701, the descriptions of which are fully incorporated herein by reference. As described more completely below, vendor device 104 can include logic by which vendor device 104 can generate its digital fingerprint or can execute logic retrieved from personal information server 108, e.g., within a web browser, to generate its fingerprint.

In test step 204 (FIG. 2), personal information server 108 determines whether vendor device 104 is already currently authorized to access the individual's personal information of the type indicated in the request of step 202. In particular, personal information server logic 820 (FIG. 8) of personal information server 108 determines whether digital fingerprint 722 (FIG. 7) of vendor device 104 matches an authorized external device digital fingerprint 920 (FIG. 9) of any authorization records 916 of the personal information data record 900 associated with the individual. If any authorized external device digital fingerprint 920 matches, personal information server logic 820 determines whether associated restrictions 918 allow access to vendor device 104 currently.

Figure 9:
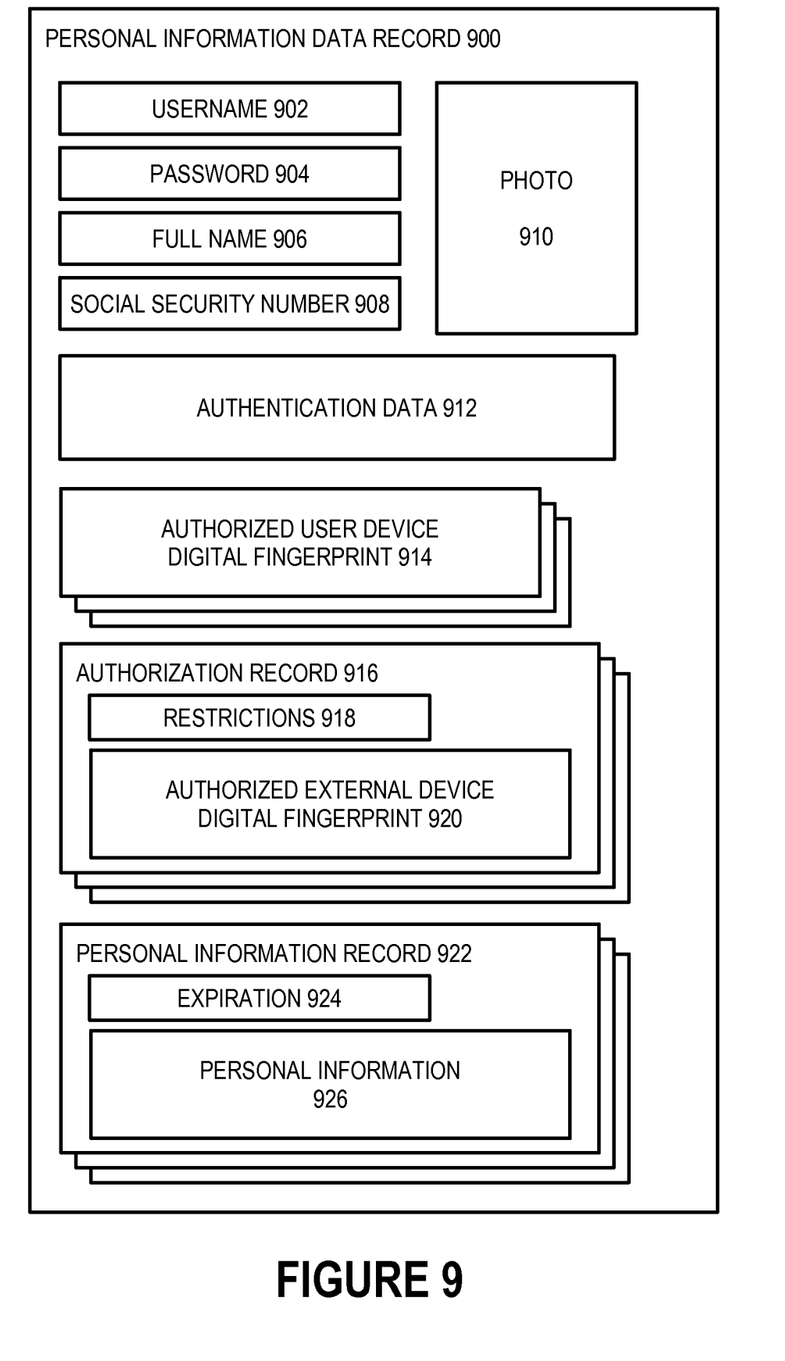
FIG. 9 is a block diagram of a personal information data record managed by the personal information server of FIG. 8 in greater detail.

Restrictions 918 can place a number of restrictions to access to the individual's personal information. Examples of restrictions include time windows, number of times personal information can be accessed, frequency of access, and types of personal information that can be accessed. For example, the individual can grant access to personal information for a limited period of time, e.g., 24 hours; the individual can grant access to personal information for no more than 3 times; the individual can grant access no more frequently than every 90 days; the individual can grant access to only credit history information; and the individual can specify any combination of those restrictions.

Thus, personal information server logic 820 determines in test step 204 that vendor device 104 is already currently authorized to access the individual's personal information if digital fingerprint 722 matches an authorized external device digital fingerprint 920 and its associated restrictions 918 are met. In such a case, processing by personal information server logic 820 transfers to step 212, skipping steps 206, 208, and 210. However, in this illustrative example, vendor device 104 is not already currently authorized to access the individual's personal information, so processing transfers to step 206.

In step 206, personal information server logic 820 (FIG. 8) sends a notice of the request for personal information of step 202 to the individual. As described below, customer device 102 includes personal information client logic 620 (FIG. 6), which can be a thick client or a thin client, and a digital fingerprint 622. Personal information client logic 620 includes a user interface by which the individual is presented with information regarding the request, including some identification of vendor device 104 and/or the dealership and the type of information requested. The user interface also allows the user to deny or grant the requested access and to specify any restrictions placed upon any granted access.

Figure 6:
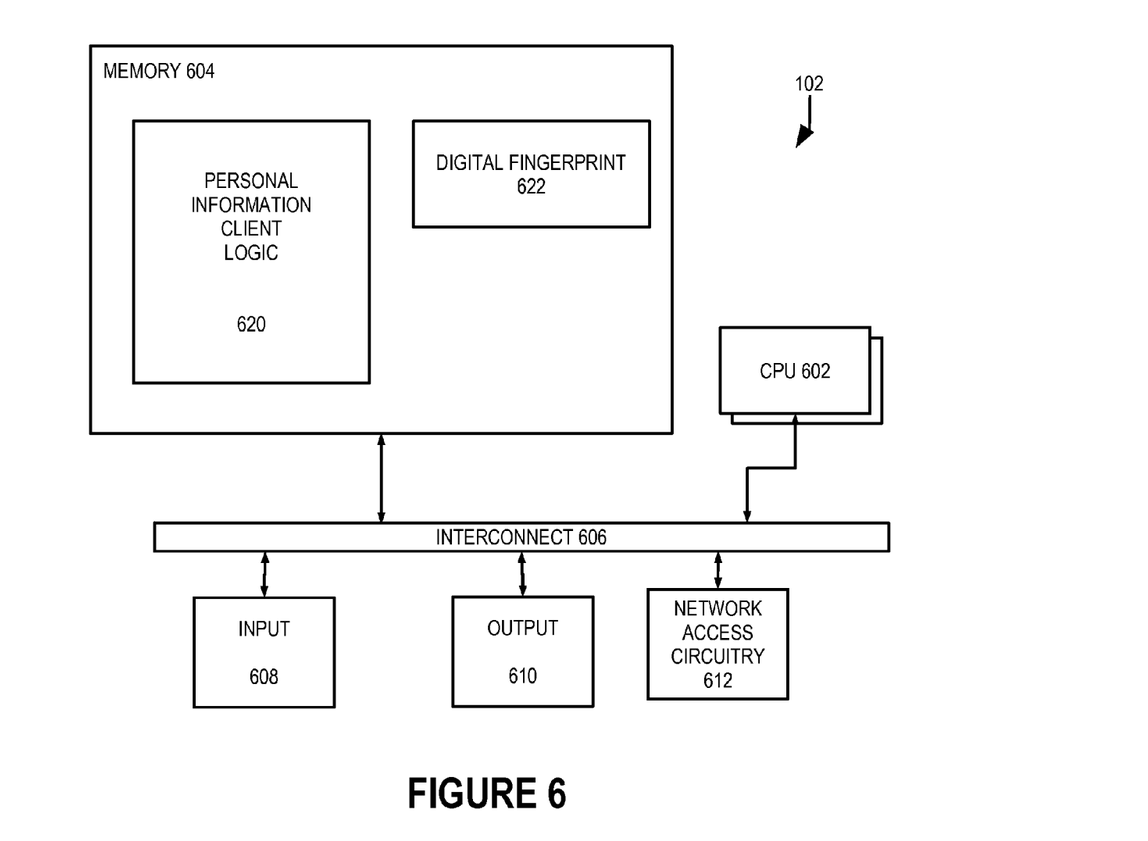
FIG. 6 is a block diagram showing the customer device of FIG. 1 in greater detail.

In step 208, personal information client logic 620 reports the selections made by the individual, including granting or denial of access and any specified restrictions and also including digital fingerprint 622 of customer device 102.

If the report of step 208, or any communication with customer device 102, does not include a digital fingerprint that matches any of authorized user device digital fingerprints 914 (FIG. 9) of the personal information data record 900 representing the individual, personal information server logic 820 (FIG. 8) locks the personal information of the individual and records the received digital fingerprint as identifying a device used to perpetrate fraud. The individual can add multiple devices as authorized for her use to manage access to her personal information in a manner described more completely below.

In addition, it should be noted that matching digital fingerprints are not necessarily identical. It is possible that some parameters (hardware, software, user-configurable, or non-user-configurable) of a given computing device from which the digital fingerprint is derived can be modified or replaced. Accordingly, some difference between "matching" digital fingerprints is permitted in predetermined ways by personal information server logic 820. This difference may be defined as a tolerance criteria, and may be set to any of various confidence levels that a true match has been found, e.g. 99.9999%, 99.99%, 99%, 90%, etc.

In another implementation, the population of authorized user device digital fingerprints 914 may include, or be restricted to, authorized user devices within the same "household". Devices within the same household—as that term is defined in co-pending U.S. Provisional Application No. 61/523,727—are those devices identified as being associated with a common local area network (LAN). For example, the digital fingerprint of each authorized device may include or be associated with a common LAN MAC address (such as the LAN MAC address of a router), or the combination of a common LAN MAC address and wide area network (WAN) IP address. Further methods for determining household commonality among authorized devices are also possible within the scope of the present invention, and such methods are disclosed in U.S. Provisional Application No. 61/523,727, which is filed concurrently herewith and which is fully incorporated herein by reference.

Figure 7:
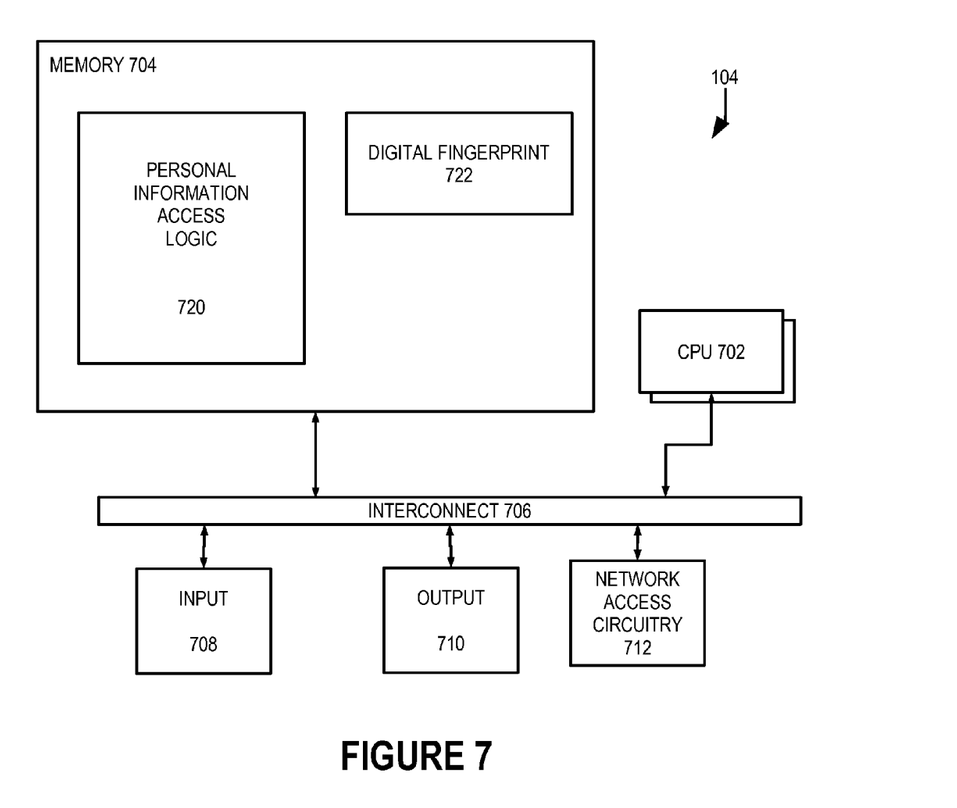
FIG. 7 is a block diagram showing the vendor device of FIG. 1 in greater detail.

If the report of step 208 is received from a properly authorized device, personal information server logic 820 (FIG. 8) determines whether the report grants access to vendor device 104 in test step 2010. If not, personal information server logic 820 marks digital fingerprint 722 of vendor device 104 as one that might be used for fraud in step 218 and reports denial of access to vendor device 104 in step 220.

Figure 3:
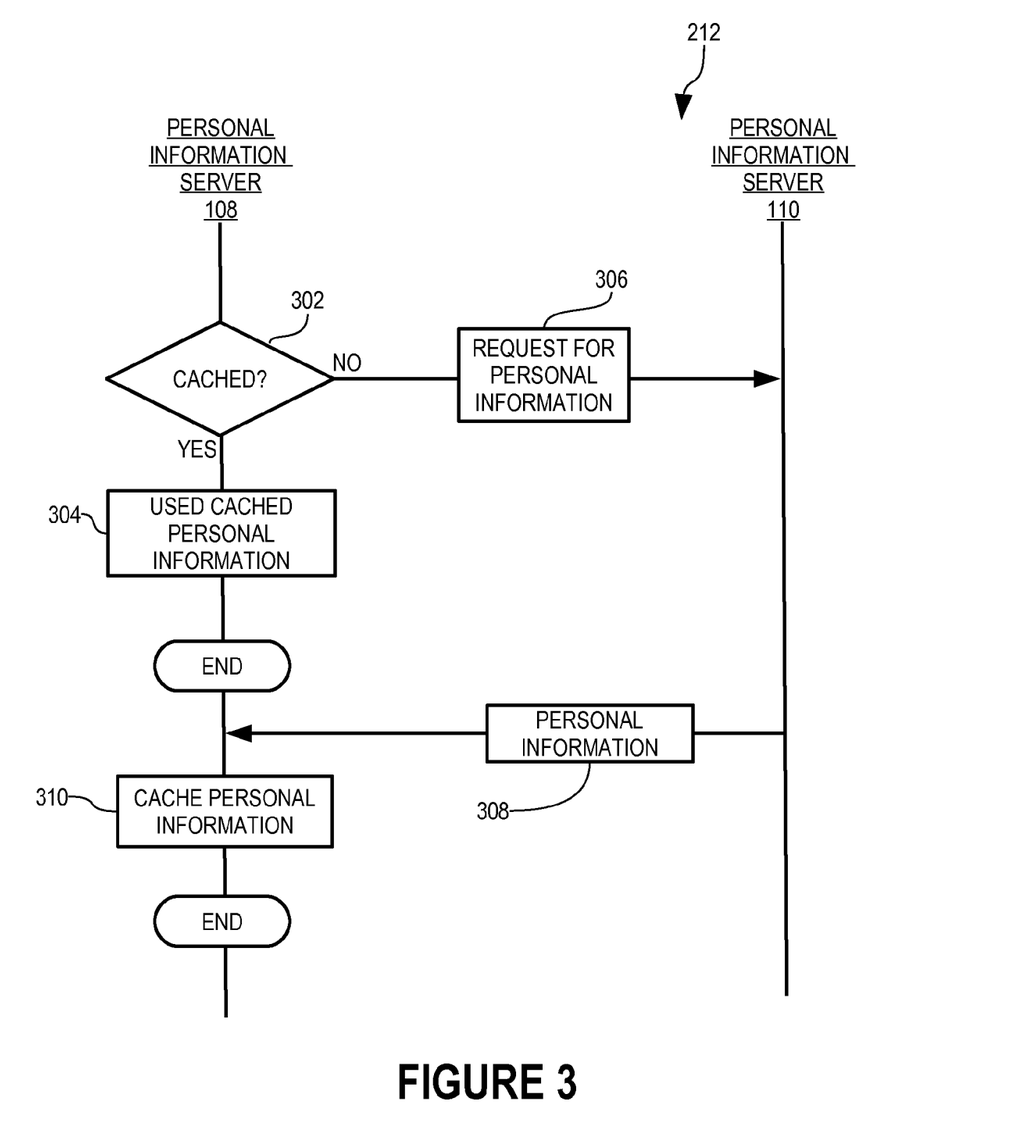
FIG. 3 is a transaction flow diagram illustrating a step of the transaction flow diagram of FIG. 2 in greater detail.

If the individual granted access to the personal information, processing by personal information server logic 820 transfers from test step 210 to step 212. Step 212 is shown in greater detail as transaction flow diagram 212 (FIG. 3).

In test step 302, personal information server logic 820 determines whether the requested personal information is cached or stored locally in personal information data record 900, e.g., as personal information 926 in any of personal information records 922 that has not yet expired according to an associated expiration 924. If so, personal information server logic 820 of personal information server 108 retrieves the appropriate personal information 926 in step 304 (FIG. 3).

Conversely, if the requested personal information is not cached or stored locally, personal information server logic 820 requests the personal information from the other personal information server 110. Personal information server logic 820 can use full name 906, social security number 908, and any of authentication data 912 to request the personal information on behalf of the individual to which the personal information pertains.

In step 308, personal information server logic 820 receives the requested personal information and stores the personal information in a new personal information record 922 with a new expiration 924, depending on the type of personal information. For example, credit history information can be cached for 30 days or one month.

Prior to sending the requested personal information to which the dealership has been granted access in step 216, personal information server logic 820 partially obscures the personal information—specifically, items of the personal information that are particularly sensitive. For example, the social security number is reduced to the last four digits in this illustrative embodiment to avoid giving the dealership the full social security number of the individual. In general, personal information such as full account numbers, identification numbers, or addresses of the individual are partially obscured to prevent discovery of the full information, but not obscured to such an extent that the dealership cannot reasonably determine that the personal information is authentic. Other items of personal information that are considered particularly sensitive in this illustrative embodiment are identifiers of the individual, such as a social security number as mentioned above as well as a driver's license number, a photo identification card number, and a passport number.

In addition, the requested personal information sent in step 216 includes a photo 910 of the individual as retrieved from the individual's personal information data record 900 for additional authentication of the individual and to further prevent fraud and identity theft.

Thus, the individual has full authority regarding which personal information third parties have access to, and under what conditions those parties have access. In addition, use of a limited number of authorized customer devices that are authenticated by digital fingerprints and the inclusion of a photo of the individual in the personal information very tightly link the actual individual to the personal information and prevent fraud. Moreover, the access granted is specific to one device used by the dealership as the granted access is limited to the device by its digital fingerprint. Such prevents access to be transferred from one third-party to others, keeps the personal information tightly controlled, avoids wide distribution of the personal information and decreases the chance of the information ending up in the hands of an identity thief.

Figure 4:
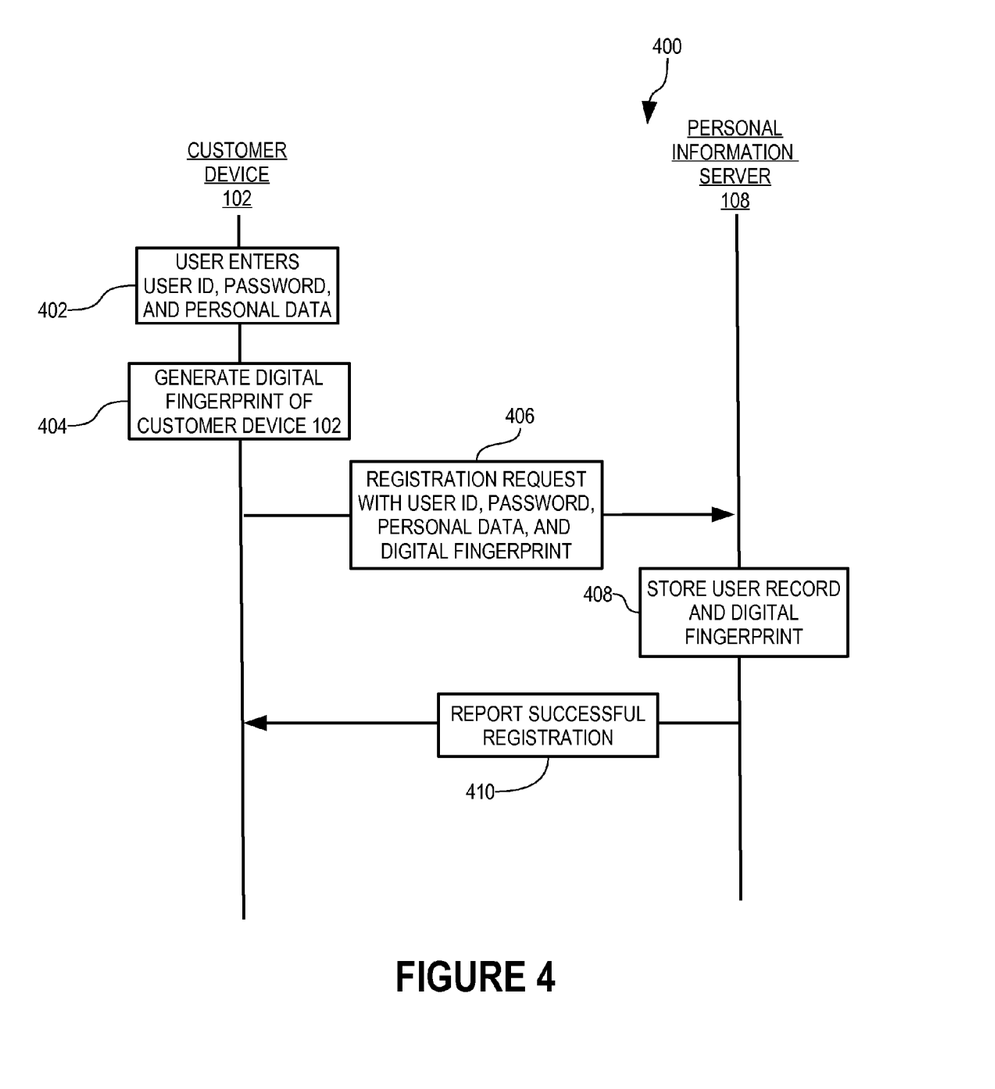
FIG. 4 is transaction flow diagram illustrating a manner in which an individual using the customer device of FIG. 1 registers with the personal information server of FIG. 1 such that the customer device can subsequently be used to control access personal information of the individual in the manner illustrated in the transaction flow diagram of FIG. 2.

Before the individual can use personal information server 108 to control access to personal information about the individual, the individual registers with personal information server 108 in the manner illustrated by transaction flow diagram 400 (FIG. 4).

The individual initiates the registration process through personal information client logic 620 (FIG. 6). Personal information client logic 620 can be a thick client that is installed within customer device 102. In such embodiments, personal information client logic 620 is downloaded, e.g., from personal information server 108, and installed within customer device 102. Alternatively, personal information client logic 620 can be a thin client, such as logic downloaded through a web browser executing in customer device 102, e.g., from personal information server 108.

Regardless of the particular manner in which the individual acquires and initiates execution of personal information client logic 620, personal information client logic 620 prompts the individual for various pieces of information and receives data representing those pieces of information in step 402 (FIG. 4). Personal information client logic 620, using conventional user interface techniques, prompts the individual through any of user output devices 610 (FIG. 6) and receives the data through any of user input devices 608 in the form of signals generated in response to physical manipulation of any of user input devices 608 by the individual.

The pieces of information include a user identifier, a password, a full name, a social security number, contact information such as an e-mail address, a photo (preferably taken at the time of registration using a web cam of customer device 102), and can also include other pieces of information that might be useful in authenticating the individual, such as the individual's mother's maiden name, the city in which the individual was born, a number of former residential addresses, etc.

In step 404 (FIG. 4), personal information client logic 620 generates digital fingerprint 622 of customer device 102 using conventional techniques.

In step 406, personal information client logic 620 sends the entered pieces of information and digital fingerprint 622 to personal information server logic 820.

In step 408, personal information server logic 820 forms a personal information data record 900 (FIG. 9) representing the individual, storing (i) the user identifier of the individual as username 902, (ii) a hash of the password of the individual as password 904, (iii) the full name of the individual as full name 906, (iv) the social security number of the individual as social security number 908, (v) the photo of the individual as photo 910, and (vi) the remaining pieces of information about the individual as authentication data 912. In addition, personal information server logic 820 adds digital fingerprint 622 to authorized user device digital fingerprints 914.

At this point, personal information server logic 820 (FIG. 8) can detect some fraud. For example, if the social security number of the individual is already associated with another individual within personal information records 824, personal information server logic 820 can request that the individual using customer device 102 re-enter the social security number. If the individual insists that the social security number is correct, personal information server logic 820 can lock both personal information data records with the same social security number until the personal information data record that properly corresponds to the social security number can be identified.

Similarly, personal information server logic 820 can search for multiple personal information data records which appear to represent a single individual or fraud in a number of other ways. Multiple personal information data records with the same digital fingerprint listed as an authorized user device digital fingerprint can suggest fraud or can suggest that multiple individuals use the customer device in question. Multiple personal information data records in which full name 906 and authentication data 912 substantially match but in which social security number 908 does not match can indicate that the individual is improperly using multiple social security numbers. Personal information server logic 820 can use facial recognition logic to compare photo 910 of multiple personal information data records to flag personal information data records that might be registered by a single individual.

In step 408 (FIG. 4), personal information server logic 820 can also retrieve personal information of the individual for storage in a personal information record 922. When personal information server logic 820 retrieves personal information of a given type from the other personal information server 110, other personal information server 110 can require additional authentication of the individual, typically in a challenge/response dialog in which a number of questions are posed that only the individual would know. The questions are often multiple choice, such as "at which of the following addresses have you lived?" The choices then include a number of addresses, one of which is retrieved from the personal information of the individual. Examples of similar questions include, "at which bank did you open an account in the last 3 months?" and "what is your mother's maiden name?"

Personal information server logic 820 will be able to answer some of those questions on behalf of the individual, e.g., if the answer can be parsed from authentication data 912 or any personal information already stored in personal information records 922, even those that have expired.

Sometimes, personal information server logic 820 will have insufficient data in personal information data record 900 to properly respond to the challenges of other personal information server 110. In such circumstances, personal information server logic 820 forward the challenges to the individual and collects the responsive information. This applies also to step 306 (FIG. 3). Generally, as personal information data record 900 becomes more complete, the individual will not be required for proper responses to authentication challenges from other personal information server 110.

Once personal information data record 900 is created and populated with the data received in step 406 (FIG. 4), personal information server logic 820 reports successful registration to personal information client logic 620 and the individual.

Figure 5:
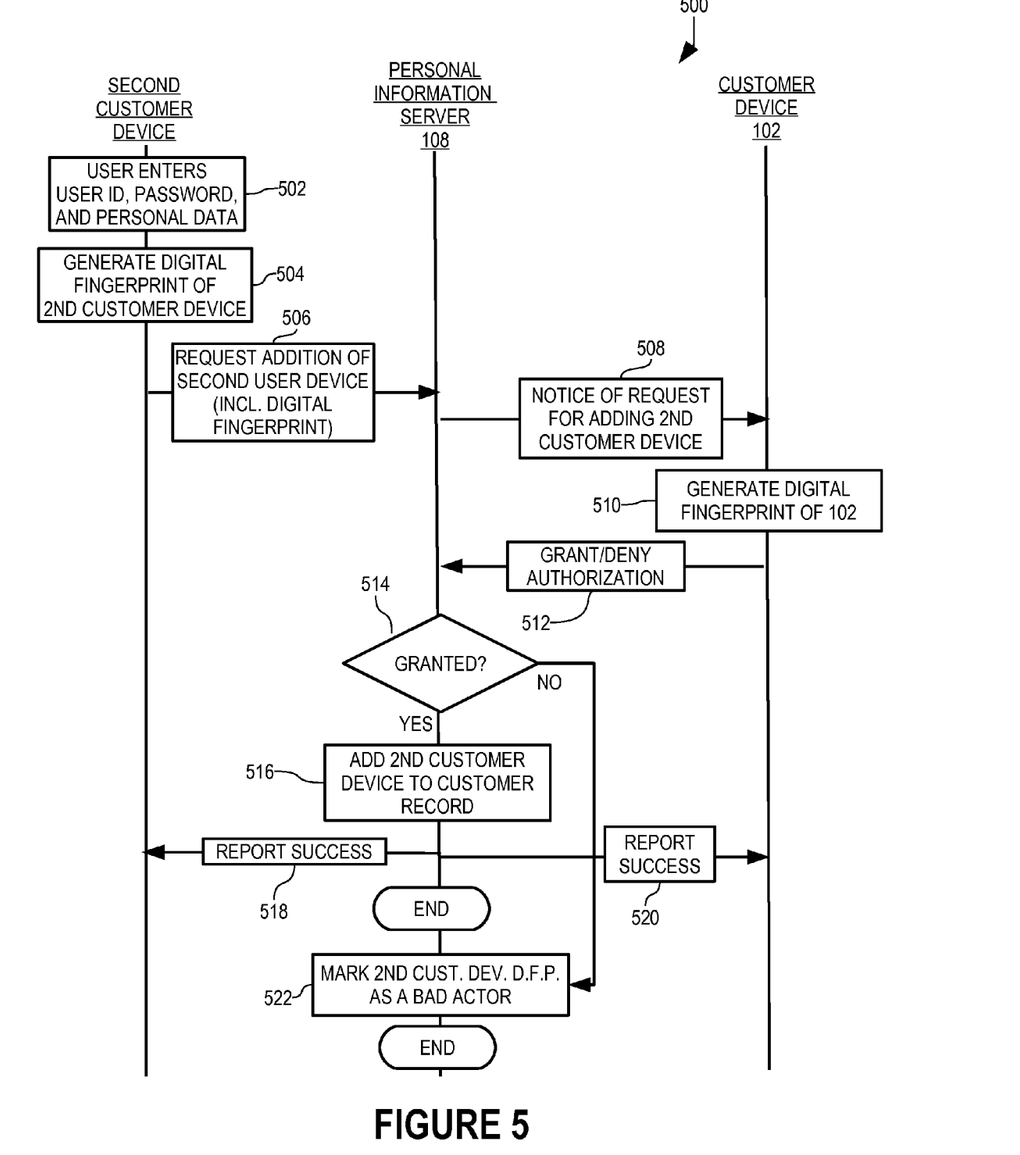
FIG. 5 is a transaction flow diagram illustrating a manner in which an individual registers a second customer device with the personal information server such that the individual can use either of two customer devices to control access to personal information about the individual in the manner illustrated in the transaction flow diagram of FIG. 2.

The individual may wish to control access to the individual's personal information from any of a number of devices. For example, the individual might have a computer at home, a computer at work, and a smart-phone. Personal information server logic 820 allows the individual to register additional customer devices to an existing personal information data record 900 in the manner illustrated in transaction flow 500 (FIG. 5).

Initially, the individual is using a second customer device that is analogous to customer device 102 and that the individual would like to occasionally use to manage access to the individual's personal information. Personal information client logic 620 of the second customer device receives the individual's user identifier and password in step 502 and generates a digital fingerprint of the second customer device in step 504. Steps 502 and 504 are analogous to steps 402 and 404, respectively, except that the individual need not provide personal information beyond the user identifier and password.

In step 506, personal information client logic of the second customer device sends the data received and generated in steps 502 and 504 to personal information server logic 820, including the digital fingerprint of the second customer device. Personal information logic 820 notifies the individual of the request, e.g., using contact information of the individual such as an e-mail address, and requests granting or denial of the request by the individual in step 508.

The individual uses user-interface techniques as described above with respect to steps 206 (FIG. 2) and 208 to indicate an intent to grant or deny adding of the second customer device to her personal information management. The individual would generally grant such a request unless the request was not originated by the individual in step 502 but was instead originated by another posing as the individual in step 502.

In step 510, customer device 102 generates its digital fingerprint 622. In some embodiments, customer device 102 can re-use a recently generated digital fingerprint 622.

In step 512, personal information client logic 622 sends data indicating granting or denial of the request to authorize the second customer device to manage the personal information of the individual. The data includes digital fingerprint 622 to properly authenticate customer device 102.

In test step 514, personal information server logic 820 determines whether the data received in step 512 indicates granting of authorization to the second customer device and that the digital fingerprint in the data matches one of authorized user device digital fingerprints 914 of the personal information data record 900 representing the individual.

If so, personal information server logic 820 stores the digital fingerprint of the second customer device as another authorized user device digital fingerprint 914 in step 516. In addition, personal information server logic 820 sends a message of successful authorization of the second customer device to the second customer device in step 518 and to customer device 520. After steps 516 and 518, processing according to transaction flow diagram 500 completes.

Conversely, if personal information server logic 820 determines whether the data received in step 512 indicates denial of authorization to the second customer device and that the digital fingerprint in the data received in step 512 matches one of authorized user device digital fingerprints 914, processing transfers to step 522. In step 522, personal information server logic 820 marks the digital fingerprint of the second customer device as one that might be used for fraud. In addition, if personal information server logic 820 determines that the digital fingerprint in the data received in step 512 does not match any of authorized user device digital fingerprints 914, personal information server logic 820 can mark that digital fingerprint as one that might be used for fraud as well.

The general structure of customer device 102, vendor device 104, and personal information server 108 is similar to the general structure of computing devices common today.

Customer device 102 is a personal computing device such as a smart-phone, laptop computer, or personal computer and is shown in greater detail in FIG. 6. Customer device 102 includes one or more microprocessors 602 (collectively referred to as CPU 602) that retrieve data and/or instructions from memory 604 and execute retrieved instructions in a conventional manner. Memory 604 can include generally any computer-readable medium including, for example, persistent memory such as magnetic and/or optical disks, ROM, and PROM and volatile memory such as RAM.

CPU 602 and memory 604 are connected to one another through a conventional interconnect 606, which is a bus in this illustrative embodiment and which connects CPU 602 and memory 604 to one or more input devices 608, output devices 610, and network access circuitry 612. Input devices 608 can include, for example, a keyboard, a keypad, a touch-sensitive screen, a mouse, a microphone, and one or more cameras. Output devices 610 can include, for example, a display—such as a liquid crystal display (LCD)—and one or more loudspeakers. Network access circuitry 612 sends and receives data through computer networks such as wide area network 106 (FIG. 1).

A number of components of customer device 102 are stored in memory 604. In particular, personal information client logic 620 is all or part of one or more computer processes executing within CPU 602 from memory 604 in this illustrative embodiment but can also be implemented using digital logic circuitry. As used herein, "logic" refers to (i) logic implemented as computer instructions and/or data within one or more computer processes and/or (ii) logic implemented in electronic circuitry. Digital fingerprint 622 is data stored persistently in memory 604.

Vendor device 104 is shown in greater detail in FIG. 7. Vendor device 104 includes one or more microprocessors 702 (collectively referred to as CPU 702), an interconnect 706, input devices 708, output devices 710, network access circuitry 712 that are directly analogous to CPU 602 (FIG. 6), interconnect 606, input devices 608, output devices 610, network access circuitry 612, respectively. Network access circuitry 712 sends and receives data through computer networks such as wide area network.

A number of components of vendor device 104 are stored in memory 704. In particular, personal information access logic 720 is all or part of one or more computer processes executing within CPU 702 from memory 704 in this illustrative embodiment but can also be implemented using digital logic circuitry. Digital fingerprint 722 is data stored persistently in memory 704.

Figure 8:
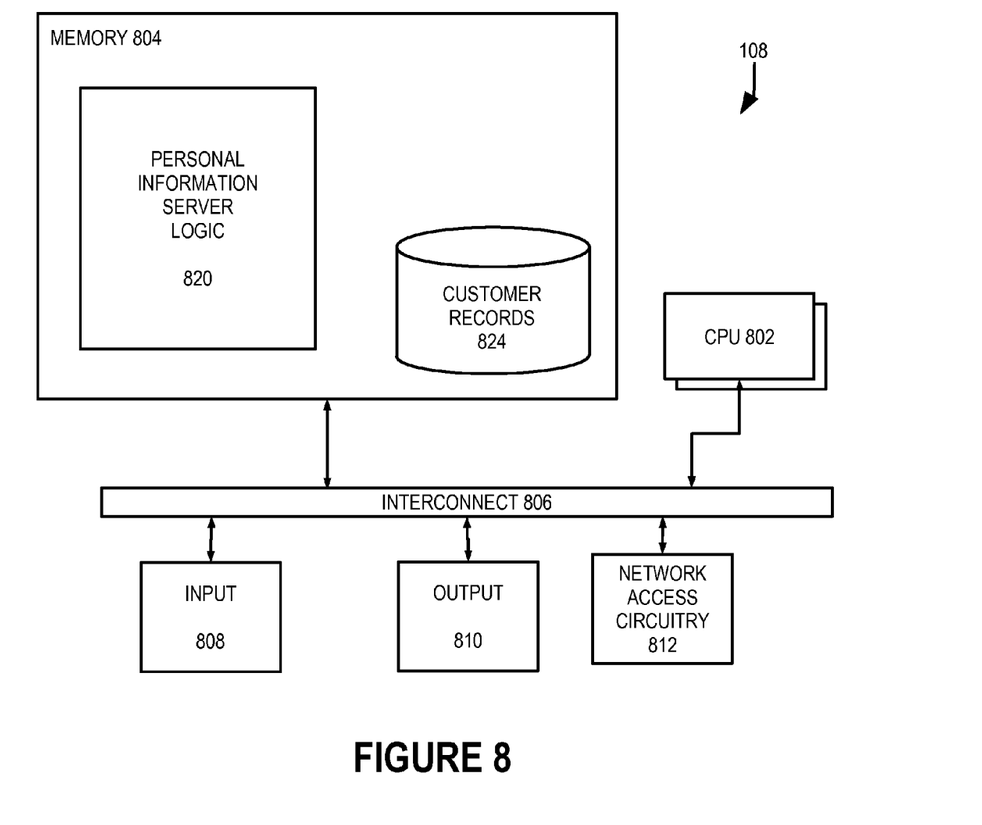
FIG. 8 is a block diagram showing the personal information server of FIG. 1 in greater detail.

Personal information server 108 is shown in greater detail in FIG. 8. Personal information server 108 includes one or more microprocessors 802 (collectively referred to as CPU 802), an interconnect 806, input devices 808, output devices 810, network access circuitry 812 that are directly analogous to CPU 602 (FIG. 6), interconnect 606, input devices 608, output devices 610, network access circuitry 612, respectively. As device identifier server 112 (FIG. 8) is a server computer, input devices 808 and output devices 810 can be omitted.

A number of components of personal information server 108 are stored in memory 804. In particular, personal information server logic 820 is all or part of one or more computer processes executing within CPU 802 from memory 804 in this illustrative embodiment but can also be implemented using digital logic circuitry. Customer records 824 are data stored persistently in memory 604. In this illustrative embodiment, customer records 824 are organized as one or more databases. Customer records 824 includes personal information data records such as personal information data record 900 (FIG. 9) for all individuals whose personal information is managed through personal information server 108.

In addition, customer records 824 stores information regarding which digital fingerprints have been marked as potentially connected with fraudulent activity in the situations described above. There are other ways in which personal information server logic 820 identifies and prevents fraud by use of the store of digital fingerprints of owners of personal information and others attempting to access such information.

One way in which personal information server logic 820 can detect fraud is by a number of customer devices being authorized to control access to a given personal information data record 900 (FIG. 9) exceeding a predetermined limit. For example, it may be deemed that a given individual will be unlikely to use more than three devices to control access to her personal information. Accordingly, five (5) authorized customer devices might raise alarm, ten (10) can be assumed to indicate fraudulent activity, and thirty (30) or more quite certainly indicates fraudulent activity.

Another way in which personal information server logic 820 can detect fraud is by determining a number of personal information data records such as personal information data record 900 (FIG. 9) for which a given digital fingerprint is authorized to control personal information access. Digital fingerprint 622 (FIG. 6) uniquely identifies customer device 102 among all customer devices with which personal information server 108 interacts. Thus, inclusion of digital fingerprint 622 in multiple personal information data records in customer records 824 (FIG. 8) represents that multiple individuals use the same computing device to control access to their personal information. While it is not uncommon for a given computing device to be used by more than one person, it can be a policy of personal information server logic 820 to never allow a single customer device to be used to control access to personal information of more than one individual. Such a policy can also be implemented for specific types of customer devices, such as smart-phones and other portable and highly personal devices.

Beyond just the number of individuals whose personal information access can be controlled by a single customer device, personal information server logic 820 can make other comparisons between the multiple personal information data records to detect fraudulent behavior. For example, authentication data 912 (FIG. 9) includes residential addresses of the subject individual. If customer records 824 (FIG. 8) indicates that individuals living hundreds or even thousands of miles apart are sharing a computer to manage access to their personal information, such is so unlikely to be accurate information as to warrant an assumption of fraudulent behavior. A predetermined distance between associated current residential addresses can be set as a threshold at which fraudulent activity is presumed by personal information server logic 820. To be particularly secure, personal information server logic 820 can require that the respective current residential addresses of the multiple individuals be the same, e.g., a predetermined distance of zero meters.

Once personal information server logic 820 has determined to an acceptable degree of certainty that a given digital fingerprint identifies a device that has been used to perpetrate fraud, personal information server logic 820 adds the digital fingerprint to a blacklist in customer records 824. Personal information server logic 820 refuses all requests of any kind that are associated with digital fingerprints on the blacklist.

Such dramatically and effectively reduces a certain type of identity theft. In particular, some nefarious individuals purchase numerous identities and use a single computer that has been modified with expensive tools for hiding real IP and MAC addresses and otherwise obscuring any digital trails that might identify the nefarious individual. Once personal information server logic 820 has determined that the single computer has been used to perpetrate fraud, the single computer is no longer of any use to the nefarious individual.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for controlling access to personal information about an individual, the method comprising:
   receiving, from a third-party device through a computer network, a request for the personal information about the individual that includes a digital fingerprint of the third-party device;
   sending a notification of the request for the personal information of the individual to the individual;
   receiving authorization data that indicates whether the individual intends to grant the request for the personal information of the individual and a digital fingerprint of an authorizing device from which the authorization data is sent;
   determining, based on the digital fingerprint, a total number of individuals for whom authorization data was sent from the authorizing device;
   comparing the total number of individuals to a predetermined limit; and
   upon a condition in which both (i) the authorization data indicates that the individual intends to grant the request for the personal information of the individual; (ii) the digital fingerprint of the authorization data matches a digital fingerprint of at least one predetermined authorized device; and (iii) the total number of individuals is no more than the predetermined limit, sending the personal information to the third-party device;
   wherein sending the personal information to the third-party device comprises:
      determining whether a copy of the personal information is cached in a local non-transitory computer readable medium; and
      upon a condition in which no copy of the personal information is cached in the local non-transitory computer readable medium:
         retrieving the personal information from a remotely located computer system; and
         caching a copy of the personal information in the local non-transitory computer readable medium.

2. The method of claim 1 further comprising:
   upon a condition in which the authorization data indicates that the individual intends to deny the request for the personal information of the individual, recording data that indicates that the third-party device may be used in perpetrating fraud; and
   upon a condition in which the digital fingerprint of the authorization data does not match a digital fingerprint of any predetermined authorized device, recording data that indicates that the authorizing device may be used in perpetrating fraud.

3. The method of claim 1 wherein authorization data specifies one or more restrictions for subsequent access to the personal information of the individual through the third-party device, the one or more restrictions selected from a group consisting essentially of:
   one or more periods of time during which access to the personal information is granted;
   a maximum number of times access to the personal information will be granted;

a minimum frequency of access to the personal information; and one or more types of information of the personal information; and the method further comprising:
  determining whether one or more subsequent requests for the personal information received from the third-party device comport with the restrictions; and
  upon a condition in which a subsequent request from the third-party device for the personal information comports with the restrictions, sending the personal information to the third-party device without obtaining reauthorization from the individual.

4. A computer system comprising:

at least one processor;

a non-transitory computer readable medium that is operatively coupled to the processor;

network access circuitry that is operatively coupled to the processor; and personal information server logic (i) that executes in the processor from the non-transitory computer readable medium and (ii) that, when executed by the processor, causes the computer to control access to personal information about an individual by at least:
  receiving, from a third-party device through a computer network, a request for the personal information about the individual that includes a digital fingerprint of the third-party device;
  sending a notification of the request for the personal information of the individual to the individual;
  receiving authorization data that indicates whether the individual intends to grant the request for the personal information of the individual and a digital fingerprint of an authorizing device from which the authorization data is sent;
  determining, based on the digital fingerprint, a total number of individuals for whom authorization data was sent from the authorizing device;
  comparing the total number of individuals to a predetermined limit; and
  upon a condition in which both (i) the authorization data indicates that the individual intends to grant the request for the personal information of the individual; (ii) the digital fingerprint of the authorization data matches a digital fingerprint of at least one predetermined authorized device; and (iii) the total number of individuals is no more than the predetermined limit, sending the personal information to the third-party device;

wherein sending the personal information to the third-party device comprises:
  determining whether a copy of the personal information is cached in a local non-transitory computer readable medium; and
  upon a condition in which no copy of the personal information is cached in the local non-transitory computer readable medium:
    retrieving the personal information from a remotely located computer system; and
    caching a copy of the personal information in the local non-transitory computer readable medium.

5. The computer system of claim 4 wherein the personal information server logic causes the computer to control access to personal information about an individual by at least also:
  obscuring at least a portion of one or more particularly sensitive items of the personal information to produce obscured personal information;
  wherein the particularly sensitive items are selected from a group consisting essentially of: a social security number of the individual, identifiers of the individual, and account numbers of financial accounts held by the individual; and
  further wherein the sending of the personal information to the third-party device includes sending the obscured personal information to the third-party device.

\* \* \* \* \*